US012338977B1

(12) United States Patent
Hu

(10) Patent No.: US 12,338,977 B1
(45) Date of Patent: Jun. 24, 2025

(54) STRING LIGHT STRUCTURE

(71) Applicant: Xiaoyan Hu, Yangjiang (CN)

(72) Inventor: Xiaoyan Hu, Yangjiang (CN)

( * ) Notice: Subject to any disclaimer, the term of this patent is extended or adjusted under 35 U.S.C. 154(b) by 0 days.

(21) Appl. No.: 18/955,674

(22) Filed: Nov. 21, 2024

(51) Int. Cl.
*F21V 21/002* (2006.01)
*F21S 4/10* (2016.01)
*F21V 23/06* (2006.01)

(52) U.S. Cl.
CPC .............. *F21V 21/002* (2013.01); *F21S 4/10* (2016.01); *F21V 23/06* (2013.01)

(58) Field of Classification Search
CPC ...... F21V 21/008; F21V 23/06; F21V 21/002; F21S 4/10
See application file for complete search history.

(56) References Cited

FOREIGN PATENT DOCUMENTS

| | | | | |
|---|---|---|---|---|
| CN | 111022964 A | * | 4/2020 | |
| CN | 113566133 A | * | 10/2021 | |
| DE | 202023100999 U1 | * | 4/2023 | ................ F21S 4/10 |

OTHER PUBLICATIONS

Innovation Q+ NPL Search (Year: 2024).*

* cited by examiner

*Primary Examiner* — Anabel Ton
(74) *Attorney, Agent, or Firm* — Birchwood IP

(57) ABSTRACT

A string lamp structure is provided, which includes a light bulb component, a lamp holder, a wire, and a lamp cover. The lamp holder is provided with a positive electrode elastic sheet and a negative electrode elastic sheet, the light bulb component is moveably connected to the lamp holder and electrically connected to the positive electrode and negative electrode elastic sheets. The wire horizontally passes through the lamp holder and abuts against the positive electrode and negative electrode elastic sheets, the lamp cover is movably connected to the lamp holder; when the lamp cover presses against the lamp holder, the lamp cover squeezes the wire, the positive electrode and negative electrode elastic sheets are caused to puncture the wire, thereby forming a conductive state. This way achieves a welding free process, significantly simplifies a production process, improves an overall production efficiency, reduces a production cost, and has strong practicality.

9 Claims, 7 Drawing Sheets

STRING LIGHT STRUCTURE

TECHNICAL FIELD

The present disclosure relates to the field of string light technologies, and in particular, to a string light structure.

BACKGROUND

The current production of string lights requires injection molding, shell fastening, and welding processes, which are complex and inefficient, which results in high production costs.

SUMMARY

The purpose of the present disclosure is to overcome the shortcomings of existing technology and provide a string light structure.

In order to solve the above technical problems, the present disclosure adopts the following technical solution.

Embodiments of the present disclosure provides the string lamp structure, including: a light bulb component, a lamp holder, a wire, and a lamp cover; the lamp holder is provided with a positive electrode elastic sheet and a negative electrode elastic sheet; the light bulb component is movably connected to the lamp holder and electrically connected to the positive electrode elastic sheet and the negative electrode elastic sheet; the wire horizontally passes through the lamp holder and abuts against the positive electrode elastic sheet and the negative electrode elastic sheet; the lamp cover is movably connected to the lamp holder; when the lamp cover presses against the lamp holder, the lamp cover squeezes the wire, the positive electrode elastic sheet and the negative electrode elastic sheet are caused to puncture the wire, thereby forming a conductive state.

The string lamp structure of the present disclosure has the beneficial effect compared with the prior art that when the lamp cover is configured to press the wire, the positive and negative elastic sheets puncture the wire, thereby directly forming a conductive state. This way realizes a welding free process, significantly simplifies a production process, improves an overall production efficiency, reduces a production cost, and has strong practicality.

The present disclosure will be further described in combination with the accompanying drawings and specific embodiments.

DESCRIPTION OF EMBODIMENTS

Figure 1:
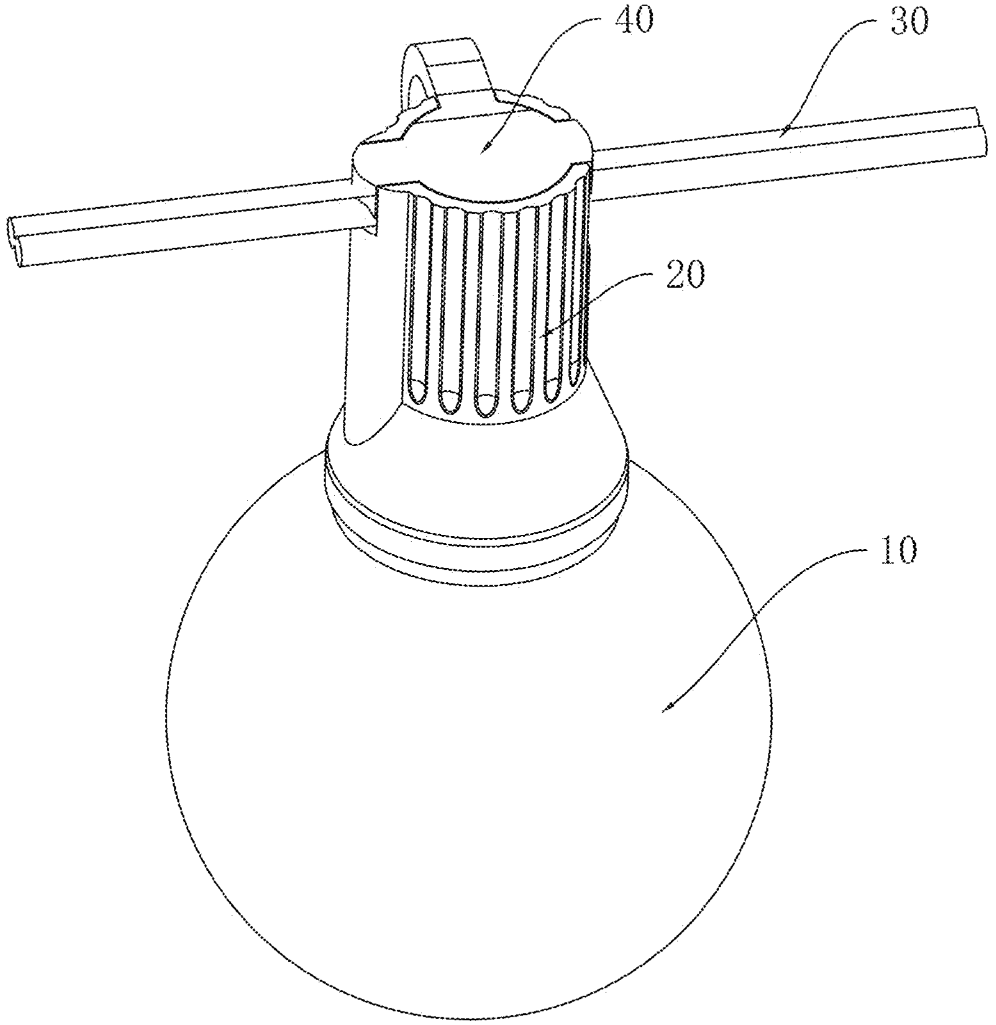
FIG. 1 is a three-dimensional schematic diagram of a string lamp structure provided by the present disclosure.

In order to clarify the purpose, technical solution, and advantages of the present disclosure, further detailed explanations will be provided below in combination with the accompanying drawings and specific implementation modes.

Referring to the specific embodiments shown in FIGS. 1 to 7, the present disclosure discloses a string lamp structure, including: a light bulb component 10, a lamp holder 20, a wire 30, and a lamp cover 40. The lamp holder 20 is provided with a positive electrode elastic sheet 50 and a negative electrode elastic sheet 60. The light bulb component 10 is movably connected to the lamp holder 20 and electrically connected to the positive electrode elastic sheet 50 and the negative electrode elastic sheet 60. The wire 30 horizontally passes through the lamp holder 20 and abuts against the positive electrode elastic sheet 50 and the negative electrode elastic sheet 60. The lamp cover 40 is movably connected to the lamp holder 20; when the lamp cover 40 presses against the lamp holder 20, the lamp cover 40 squeezes the wire 30, thereby causing the positive electrode elastic sheet 50 and the negative electrode elastic sheet 60 to puncture the wire 30, and forming a conductive state.

In an implementation mode, the positive elastic sheet 50 is configured for connecting the live wire, and negative elastic sheet 60 is configured for connecting the neutral wire. A traditional combination of the lamp cover 40 and the lamp holder 20 requires a welding process. The string lamp structure uses the lamp cover 40 to press the wire 30 tightly, causing the positive elastic sheet 50 and the negative elastic sheet 60 to puncture the wire 30, thereby directly forming the conductive state. This way achieves a welding free process, significantly simplifies a production process, improves overall production efficiency, reduces the cost, and has strong practicality. Besides that, the welding not only requires specific equipment and materials, but may also require skilled workers to operate, which increases the production cost. This technology simplifies the production process, reduces the additional cost, and lowers the production cost.

As shown in FIGS. 2 to 5, in one embodiment, tops of both the positive electrode elastic sheet 50 and the negative electrode elastic sheet 60 are provided with a sharp protrusion 51 for puncturing the wire 30.

In an implementation mode, the sharp protrusions 51 of the positive electrode elastic sheet 50 and the negative electrode elastic sheet 60 form a staggered distribution, one is on a left side and the other is on a right side. When the lamp cover 40 presses the wire 30, the positive electrode elastic sheet 50 and the negative electrode elastic sheet 60 puncture an outer skin of the wire 30 and form an effective contact with cables in the wire 30, thus forming the conductive state. That is to say, the staggered distribution of the sharp protrusions 51 (one on the left and one on the right) ensures that the positive elastic sheet 50 and the negative elastic sheet 60 can respectively puncture different parts of the wire 30, thereby avoiding a short circuit and ensuring a correct electrical connection. This design increases the reliability and safety of the connection. In addition, due to the design of the sharp protrusions 51, when the lamp cover 40 squeezes the wire 30, which can quickly and effectively puncture the outer skin of the wire 30, forming the conductive state, improving the efficiency of the connection, and reducing possible faults during a connection process. And the design of the sharp protrusion 51 further has certain adaptability, which can cope with different thicknesses and materials of the skin of the wire 30. This flexibility enables the technology to be applied to a wider range of scenarios and product lines.

As shown in FIGS. 2 to 6, in one embodiment, the lamp holder 20 is provided with a first placement chamber 21 and a second placement chamber 22. The first placement chamber 21 is configured to install the positive electrode elastic sheet 50, and the second placement chamber 22 is configured to install the negative electrode elastic sheet 60.

In an implementation mode, by providing the first placement chamber 21 and the second placement chamber 22, installation positions of the positive electrode elastic sheet 50 and the negative electrode elastic sheet 60 can be clearly distinguished, avoiding confusion and incorrect installation. In addition, two placement chambers provide a stable installation environment for the positive elastic sheet 50 and the negative elastic sheet 60, ensuring that they can be correctly connected to the wire 30 and the light bulb component 10, thereby achieving circuit closure and lighting. And the design of the placement chambers renders the installation of the positive electrode elastic sheet 50 and the negative electrode elastic sheet 60 simple and fast, without a need for complex operations or tools, reducing assembly difficulty and costs.

As shown in FIGS. 3 to 6, in one embodiment, the first placement chamber 21 is provided with a first clamping groove 211 for fixing the positive electrode elastic sheet 50, and the second placement chamber 22 is provided with a second clamping groove 221 for fixing the negative electrode elastic sheet 60.

In an implementation mode, the design of the first clamping groove 211 and the second clamping groove 221 enables the positive electrode elastic sheet 50 and the negative electrode elastic sheet 60 to be accurately positioned at a predetermined positions during installation, avoiding offset or misalignment during the installation process. In addition, through a fixing effect of the clamping groove, the positive elastic sheet 50 and the negative elastic sheet 60 can be firmly fixed in the placement chambers, preventing loosening or detachment during use, thereby ensuring the stability and safety of the circuit. And the contact between the fixed elastic sheet and the wire 30 is more stable, reducing circuit failures caused by poor contact, such as bulb flickering and non-illumination. In addition, a secure fixing manner can reduce the deformation or damage caused by uneven force on the elastic sheets during use, thereby extending the service life of the lamp. In addition, the design of the clamping groove renders the installation of the positive electrode elastic sheet 50 and the negative electrode elastic sheet 60 easier and faster, without the need for additional fixing tools or steps, reducing assembly difficulty and costs.

As shown in FIGS. 2 to 6, in one embodiment, the lamp holder 20 is further provided with a limit protrusion 23, which is matched with the wire 30.

In an implementation mode, the limit protrusion 23 forms a limit state with a middle position of the wire 30, allowing the wire 30 to only move along a cross-sectional direction of the wire 30. That is to say, the design of the limit protrusion 23 enables the wire 30 to be stably fixed in the lamp holder 20 during installation, avoiding the shaking or movement of the wire 30. This stability is crucial for ensuring a normal connection of the circuit and preventing circuit failures caused by loose wire 30. In addition, by a cooperation between the limit protrusion 23 and the wire 30, it can ensure a tighter and more stable connection between the wire 30 with the positive elastic sheet 50 and the negative electrode elastic sheet 60. This tight connection helps reduce the risk of poor contact and circuit failure, thereby improving the reliability and stability of the entire circuit.

As shown in FIGS. 2 to 6, in one embodiment, a bottom of the lamp cover 40 is provided with connection blocks 41 on two sides, and the lamp holder 20 is provided with a protrusion portion 24 corresponding to the connection blocks 41.

In an implementation mode, by a cooperation between the connection blocks 41 and the protrusion portion 24, the lamp cover 40 and the lamp holder 20 can be easily connected without complex installation steps or tools, reducing the installation difficulty and cost. In addition, the design of the connection blocks 41 and the protrusion portion 24 usually has a tight fit, which can ensure a firm and reliable connection between the lamp cover 40 and the lamp holder 20, avoiding circuit failures or safety hazards caused by loose connections.

As shown in FIGS. 2 to 6, in one embodiment, lower ends of the connection blocks 41 are provided with a clamping protrusion 411, which is matched with the protrusion portion 24.

In an implementation mode, a matching design of the clamping protrusion 411 and the protrusion portion 24 can render a connection between the connection blocks 41 and the lamp holder 20 more tight and stable. This tight connection manner helps prevent the lamp cover 40 from loosening or falling off due to force during use, thereby improving the overall stability and safety of the lamp. In addition, by a cooperation between the clamping protrusion 411 and the protrusion portion 24, a user can more easily install and remove the lamp cover 40 and the lamp holder 20. This design does not require additional fixing tools or steps, reducing the complexity and cost of installation, and further improving the convenience of maintenance. Besides that, the design of the clamping protrusion 411 can also render it easier to align and position the lamp cover 40 during installation. A correct position of the lamp cover 40 can be quickly determined by the cooperation between the clamping protrusion 411 and the protrusion portion 24, thereby simplifying the installation process and improving the accuracy of installation.

As shown in FIGS. 2 to 5, in one embodiment, the lamp cover 40 is further provided with a limit groove 42 corresponding to the wire 30.

In an implementation mode, the design of the limit groove 42 can accurately fix the position of the wire 30, preventing it from shifting during installation or use. This stability ensures that the sharp protrusion 51 can accurately puncture the outer skin of the wire 30 and form an effective contact with the cables in the wire 30. This contact is the key to circuit conduction, ensuring stable current flow in the circuit and avoiding poor contact or circuit failure caused by wire 30 displacement. In addition, through a cooperation between the limit groove 42 and the sharp protrusion 51, the connection between the wire 30 and the elastic sheets can be achieved without complex operations or additional fixing steps. This design reduces the difficulty and complexity of installation and improves installation efficiency. Besides that, after the sharp protrusion 51 punctures the outer skin of the wire 30, it forms a tight contact with the cables in the wire 30. This contact manner has high stability and durability, and can withstand certain current and voltage fluctuations, rendering it less likely to cause poor contact or circuit failure due to long-term use or environmental factors.

Figure 2:
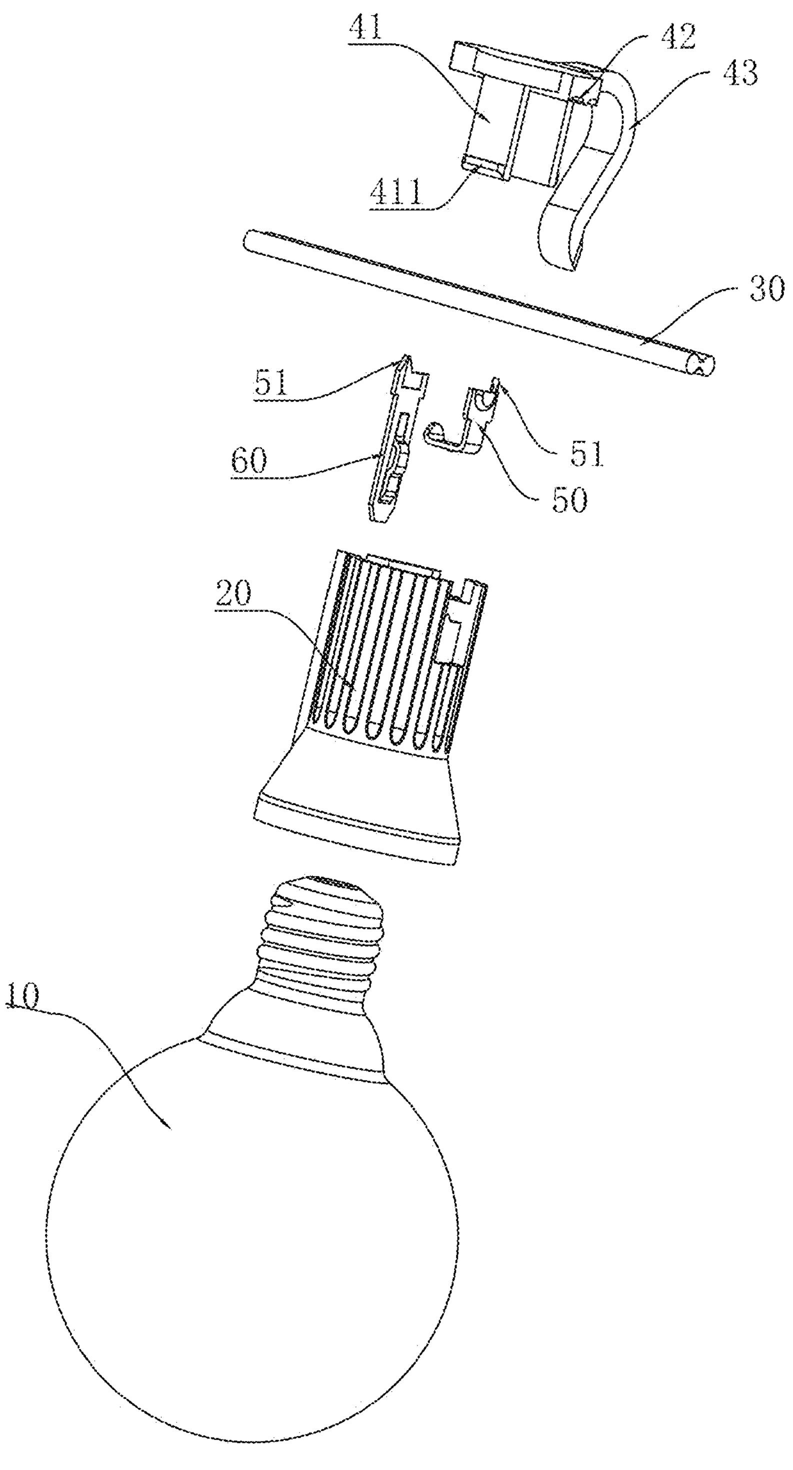
FIG. 2 is an exploded schematic diagram of the string lamp structure provided by the present disclosure.
Figure 3:
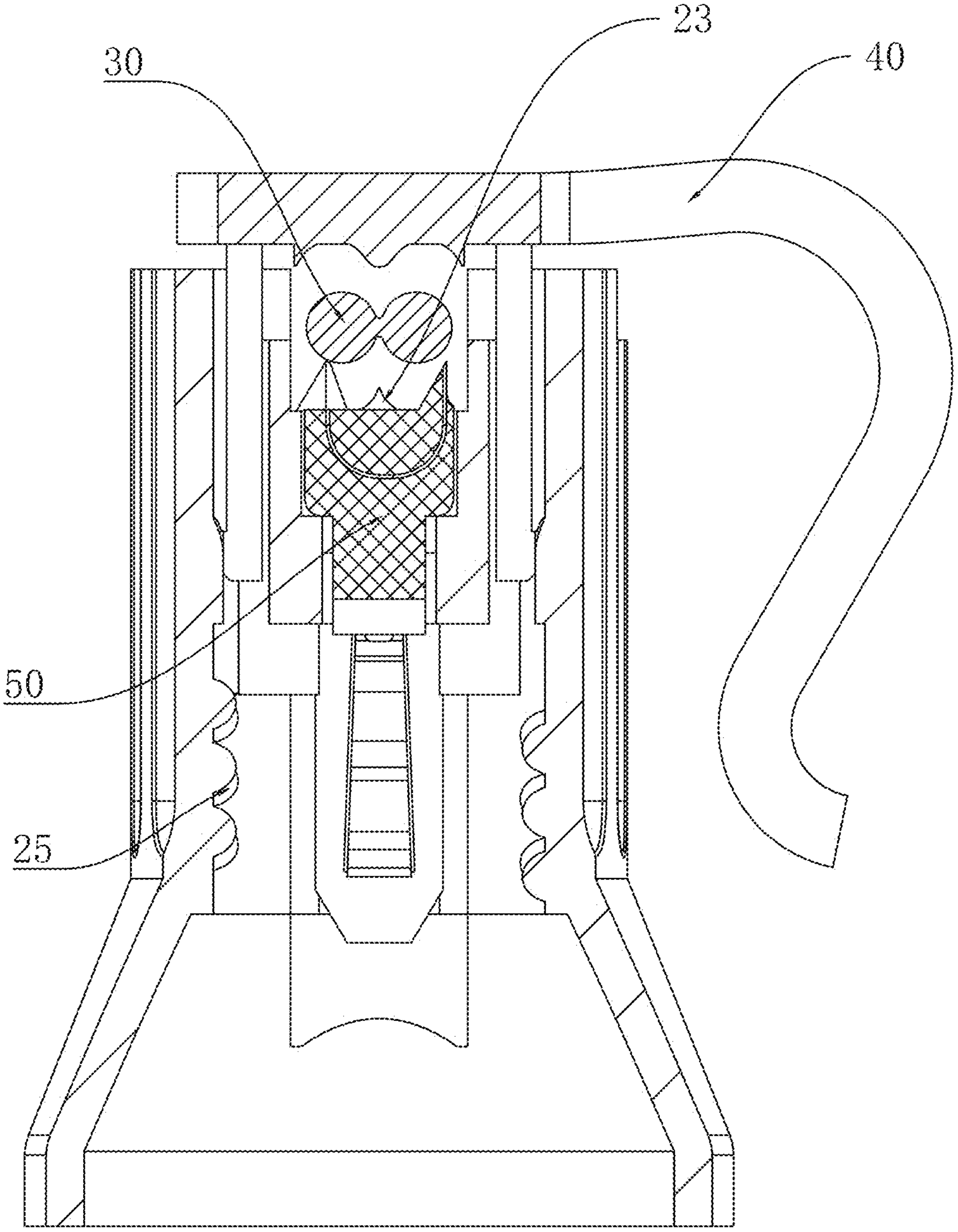
FIG. 3 is a schematic sectional view of a lamp cover and a lamp holder provided by the present disclosure in an unpressed state.
Figure 4:
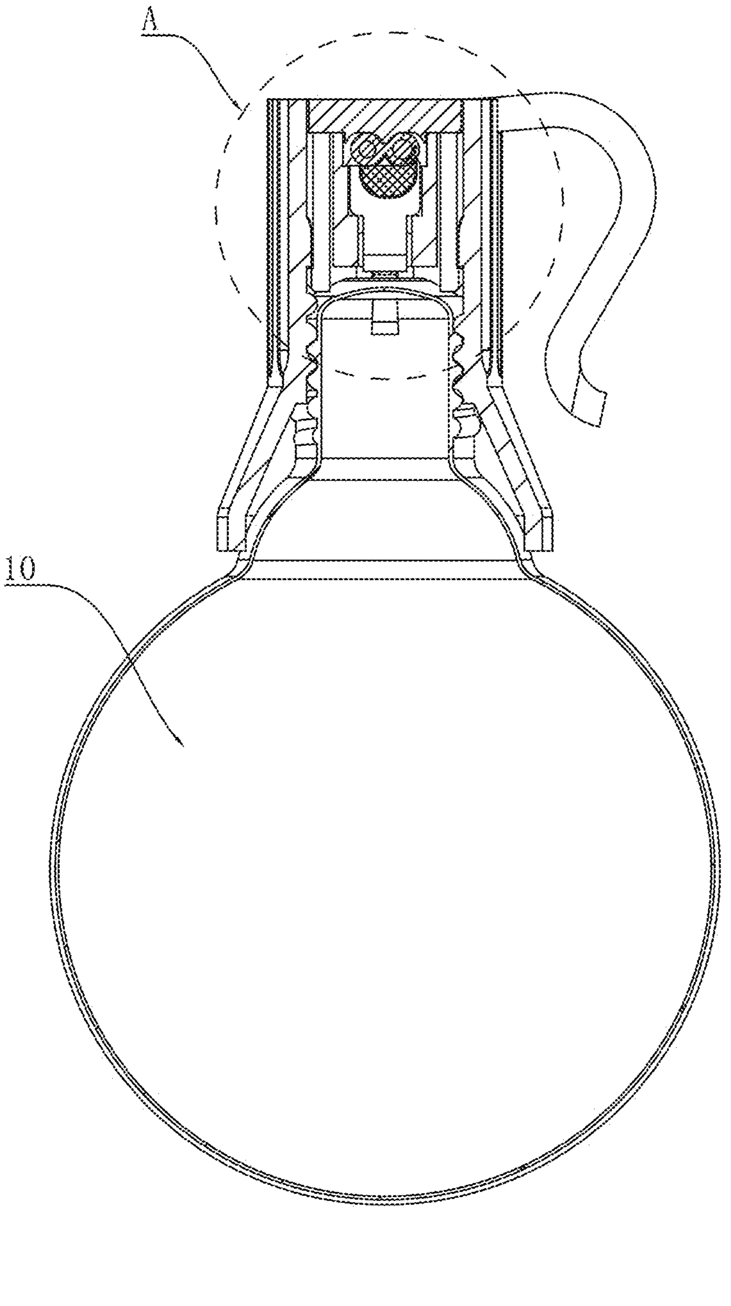
FIG. 4 is a sectional schematic diagram of the string lamp structure provided by the present disclosure in a pressing state.

As shown in FIGS. 2 to 4, in one embodiment, the lamp cover 40 is further provided with a hanging hook portion 43.

In an implementation mode, the design of the hanging hook portion 43 enables the light cover 40 to be easily connected to external structures such as ceilings, walls, or other suspension devices, simplifying the installation process of the string light. The user does not need to use complex tools or perform tedious steps to quickly complete the installation of the string light; at the same time, the hanging hook portion 43 is further convenient for the user to disassemble when needed, rendering it easy to replace or repair. Furthermore, the design of the hanging hook portion 43 has a certain universality and can adapt to various suspension environments. Whether it is ceilings, walls, or other hanging devices, the hanging hook portion 43 can provide reliable connection points, which renders the string light flexible for various occasions such as home decoration, commercial displays, holiday celebrations, etc.

Figure 5:
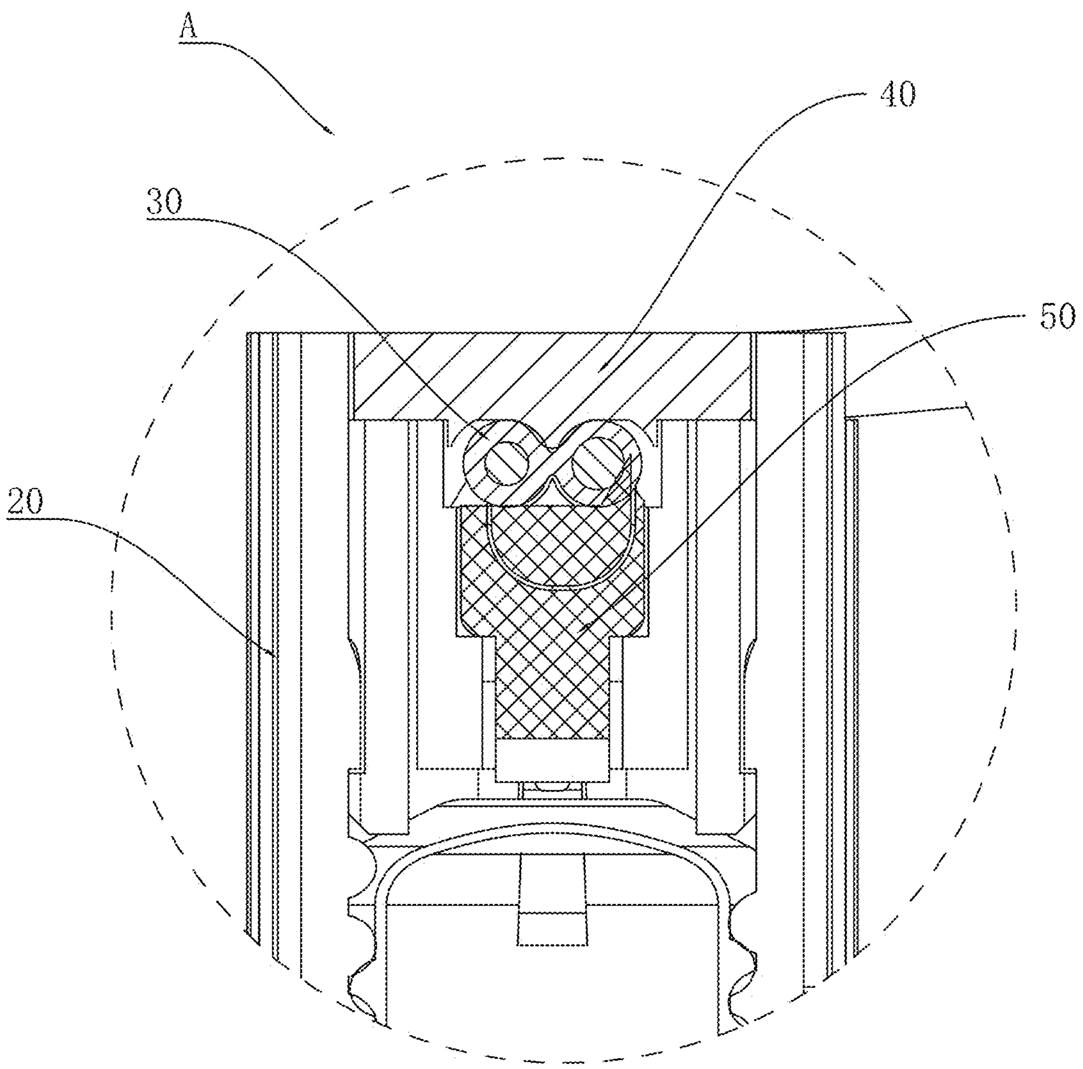
FIG. 5 is a partially enlarged schematic diagram of A in FIG. 4.
Figure 6:
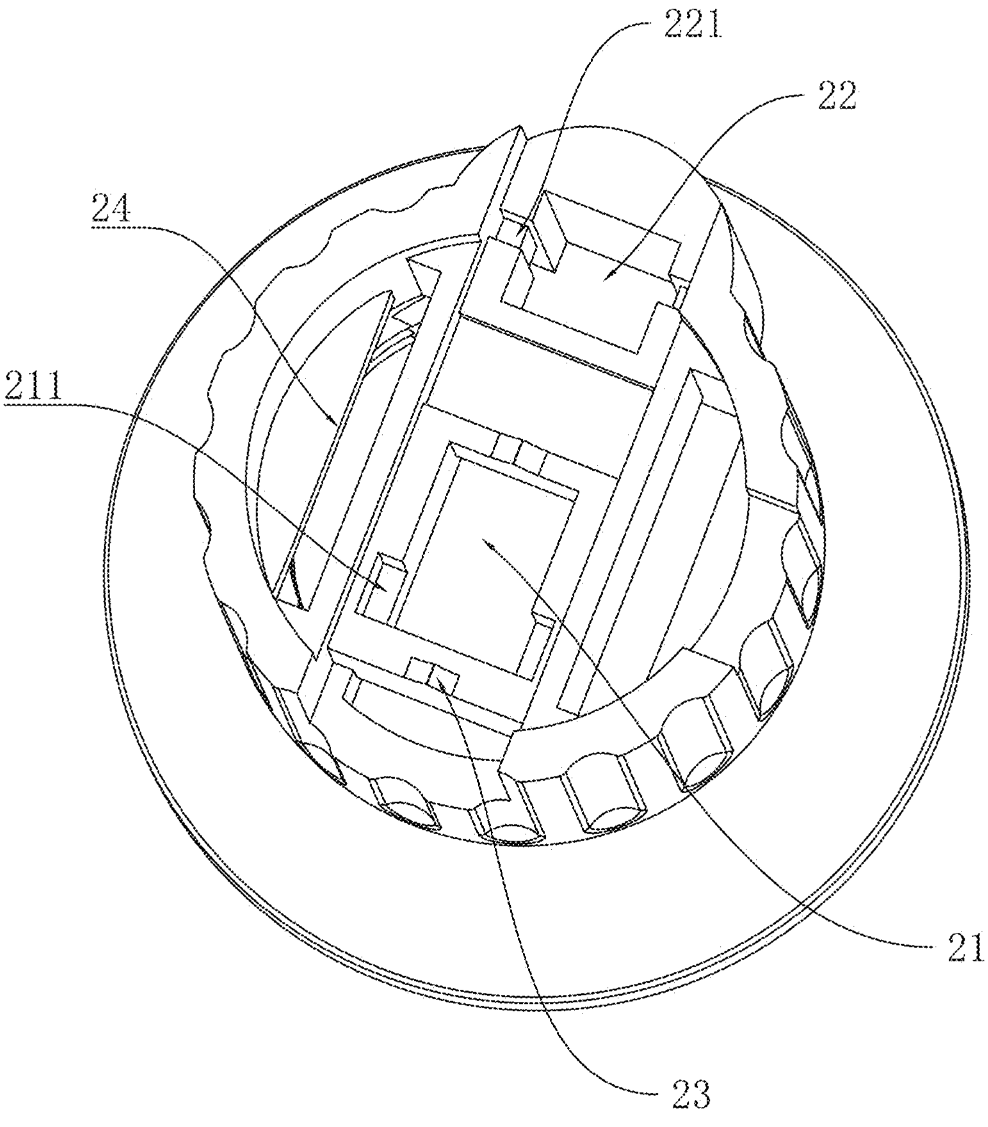
FIG. 6 is a schematic structural diagram of the lamp holder provided by the present disclosure.

As shown in FIGS. 3 to 5, in one embodiment, an inner wall of the lamp holder 20 is provided with a threaded portion 25, which is matched with the light bulb component 10.

In an implementation mode, a threaded connection is a very stable connection manner. When the light bulb component 10 is tightly connected to the threaded portion 25 in the lamp holder 20 through rotation, a very firm connection point can be formed. This connection manner can effectively prevent the light bulb component 10 from loosening or falling off due to vibration, wind or other external forces during use, thereby ensuring the stability and safety of the lamp. Furthermore, the design of the threaded connection renders the installation and disassembly of the light bulb component 10 very simple. The user only needs to rotate the light bulb component 10 to connect or detach it from the lamp holder 20, without the need for additional tools or complex steps. This design not only improves the convenience of installation, but also reduces maintenance costs. In addition, the design of threaded portion 25 has a certain degree of universality, which can adapt to various specifications of the light bulb components 10. This allows the same lamp holder 20 to adapt to a variety of different lamps, thereby improving the compatibility and flexibility of the product.

Figure 7:
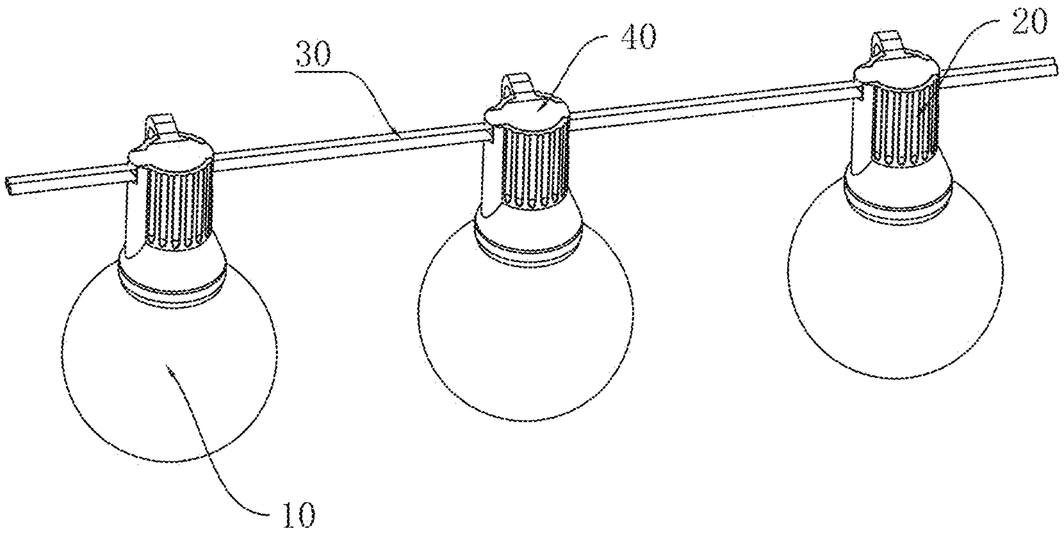
FIG. 7 is a schematic diagram of an application scenario of the string light structure provided by the present disclosure.

As shown in FIG. 7, the string light structure can be used alone or in a string of several light strips, and adjacent string lights share the same wire 30.

The above embodiments are the preferred implementation modes of the present disclosure. In addition, the present disclosure can also be implemented in other ways, and any obvious replacement is within the protection scope of the present disclosure without departing from the concept of the technical solution.

What is claimed is:

1. A string lamp structure, comprising a light bulb component, a lamp holder, a wire, and a lamp cover;

the lamp holder is provided with a positive electrode elastic sheet and a negative electrode elastic sheet; the light bulb component is movably connected to the lamp holder and electrically connected to the positive electrode elastic sheet and the negative electrode elastic sheet; the wire horizontally passes through the lamp holder and abuts against the positive electrode elastic sheet and the negative electrode elastic sheet; the lamp cover is movably connected to the lamp holder;

when the lamp cover presses against the lamp holder, the lamp cover squeezes the wire, the positive electrode elastic sheet and the negative electrode elastic sheet are caused to puncture the wire, thereby forming a conductive state;

the positive elastic sheet is configured for connecting a live wire, and negative elastic sheet is configured for connecting a neutral wire;

the lamp holder is provided with a first placement chamber and a second placement chamber, wherein the first placement chamber is configured for installing the positive electrode elastic sheet, and the second placement chamber is configured for installing the negative electrode elastic sheet.

2. The string lamp structure according to claim 1, wherein tops of both the positive electrode elastic sheet and the negative electrode elastic sheet are provided with sharp protrusions configured for puncturing the wire.

3. The string lamp structure according to claim 1, wherein the first placement chamber is provided with a first clamping groove configured for fixing the positive electrode elastic sheet, and the second placement chamber is provided with a second clamping groove configured for fixing the negative electrode elastic sheet.

4. The string lamp structure according to claim 1, wherein the lamp holder is further provided with a limit protrusion, and the limit protrusion is matched with the wire.

5. The string lamp structure according to claim 1, wherein connection blocks are provided on two sides of a bottom of the lamp cover, and the lamp holder is provided with a protrusion portion corresponding to the connection blocks.

6. The string lamp structure according to claim 5, wherein lower ends of the connection blocks are provided with a clamping protrusion, and the clamping protrusion is matched with the protrusion portion.

7. The string lamp structure according to claim 1, wherein the lamp cover is further provided with a limit groove corresponding to the wire.

8. The string lamp structure according to claim 1, wherein the lamp cover is further provided with a hanging hook portion.

9. The string lamp structure according to claim 1, wherein an inner wall of the lamp holder is provided with a threaded portion, which is matched with the light bulb component.

* * * * *